United States Patent
Zhu et al.

(10) Patent No.: US 7,279,511 B2
(45) Date of Patent: Oct. 9, 2007

(54) OPAQUE INK JET INK COMPOSITION

(75) Inventors: Linfang Zhu, Naperville, IL (US); Fengfei Xiao, Northbrook, IL (US); John P. Folkers, Arlington Heights, IL (US)

(73) Assignee: Videojet Technologies Inc., Wood Dale, IL (US)

( * ) Notice: Subject to any disclaimer, the term of this patent is extended or adjusted under 35 U.S.C. 154(b) by 62 days.

(21) Appl. No.: 10/314,163

(22) Filed: Dec. 9, 2002

(65) Prior Publication Data

US 2004/0110868 A1 Jun. 10, 2004

(51) Int. Cl.
*C09D 11/10* (2006.01)

(52) U.S. Cl. ............... 523/160; 106/31.6; 252/500

(58) Field of Classification Search ........... 523/160, 523/161; 106/31.6; 524/497, 556; 252/500
See application file for complete search history.

(56) References Cited

U.S. PATENT DOCUMENTS

| | | | |
|---|---|---|---|
| 3,060,429 A | 10/1962 | Winston | |
| 3,298,030 A | 1/1967 | Lewis et al. | |
| 3,373,437 A | 3/1968 | Sweet et al. | |
| 3,416,153 A | 12/1968 | Hertz et al. | |
| 3,673,601 A | 6/1972 | Hertz | |
| 4,365,035 A * | 12/1982 | Zabiak | 524/283 |
| 4,680,058 A | 7/1987 | Shimizu et al. | |
| 4,880,465 A | 11/1989 | Loria et al. | |
| 5,254,158 A | 10/1993 | Breton et al. | |
| 5,275,646 A | 1/1994 | Marshall et al. | |
| 5,302,195 A * | 4/1994 | Helbrecht et al. | 106/31.36 |
| 5,302,631 A * | 4/1994 | Yamada et al. | 523/160 |
| 5,460,874 A | 10/1995 | Rao | |
| 5,596,027 A | 1/1997 | Mead et al. | |
| 5,652,286 A * | 7/1997 | Deng | 524/261 |
| 5,693,127 A | 12/1997 | Nigam et al. | |
| 5,711,791 A | 1/1998 | Croker et al. | |
| 5,716,435 A | 2/1998 | Aida et al. | |
| 5,744,519 A | 4/1998 | Heraud et al. | |
| 5,772,746 A | 6/1998 | Sawada et al. | |
| 5,840,106 A | 11/1998 | Krepski et al. | |
| 5,889,083 A * | 3/1999 | Zhu | 523/161 |
| 5,935,310 A | 8/1999 | Engel et al. | |
| 5,973,025 A | 10/1999 | Nigam et al. | |
| 5,998,502 A | 12/1999 | Burr et al. | |
| 6,090,193 A | 7/2000 | Nigam et al. | |
| 6,106,600 A | 8/2000 | Lecheheb et al. | |
| 6,221,933 B1 | 4/2001 | Zhu et al. | |
| 6,309,452 B1 | 10/2001 | Beach et al. | |
| 6,461,419 B1 * | 10/2002 | Wu et al. | 106/31.6 |
| 6,794,425 B1 * | 9/2004 | Ellis et al. | 523/160 |
| 6,869,986 B1 * | 3/2005 | Millot et al. | 523/160 |
| 2003/0232902 A1 * | 12/2003 | Takahashi et al. | 523/160 |

FOREIGN PATENT DOCUMENTS

| | | |
|---|---|---|
| EP | 705890 A1 * | 4/1996 |
| EP | 1241139 A1 * | 9/2002 |
| GB | 2 105 735 | 3/1983 |
| JP | 01 043579 A | 2/1989 |
| JP | 06 220374 A | 8/1994 |
| WO | WO93/10977 | 6/1993 |
| WO | WO98 13430 A | 4/1998 |
| WO | WO 00/63305 | 10/2000 |
| WO | WO 01/09255 | 2/2001 |
| WO | WO 01/09255 A1 * | 2/2001 |
| WO | WO 02/085987 | 10/2002 |

OTHER PUBLICATIONS

Machine Translation of JP 06-220374 A (1994).*
Results of Search in PGPUB Production Database for "ink jet" and opaque and white and pigment and hydrophobic and polyurethane and acidic or acrylic: 14 Applications, 1 page, Nov. 15, 2002.
Results of Search in All Years db for: "ink jet" and opaque and conductive and hydrophobic and white and pigment and polyurethane and acidic or acrylic: 24 patents, 2 pages, Nov. 13, 2002.
Search results for: "ink jet" and opaque and conductive and hydrophobic and white and pigment and polyurethane and acidic and acrylic; collections searched: WIPO PCT Publications (Full text); 6 matches found; www.dephion.com; 1 page, Nov. 14, 2002.
Results of Search in All Years db for: "ink jet" and opaque and white and pigment and "quaternary ammonium" or tetrabutyl ammonium or "tetrabutyl ammonium": 151 patents, Hits 1 through 50 hits out of 151, 2 pages Nov. 15, 2002.
Results of Search in All Years db for: "ink jet" and opaque and white and pigment and "quaternary ammonium" or tetrabutyl ammonium or "tetrabutyl ammonium": 151 patents, Hits 51 through 100 hits out of 151, 2 pages Nov. 15, 2002.
Results of Search in All Years db for: "ink jet" and opaque and white and pigment and "quaternary ammonium" or tetrabutylammonium or "tetrabutyl ammonium": 151 patents, Hits 101 through 150 hits out of 151, 3 pages Nov. 15, 2002.

(Continued)

*Primary Examiner*—Peter Szekely
(74) *Attorney, Agent, or Firm*—Leydig, Voit & Mayer, Ltd

(57) ABSTRACT

Disclosed are opaque ink jet ink compositions and a method of printing that produce messages having a good contrast on darkly colored substrates, particularly darkly colored glass substrates, and that do not smear or degrade when exposed to moisture and/or hot and cold humid conditions, or when exposed to ice water or water under sterilizing conditions. The ink jet ink compositions comprise one or more organic solvents, one or more white pigments, one or more hydrophobic conductive agents, and one or more binder resins. In an embodiment of the ink jet ink composition, at least one binder resin comprises an acrylic or styrene acrylic resin. In another embodiment, the ink jet ink composition is free of polyamines. The ink jet ink composition may also include a glass adhesion promoter.

50 Claims, No Drawings

OTHER PUBLICATIONS

Results of Search in PGPUB Production Database for: "ink jet" and opaque and white and pigment and "quaternary ammonium" or tetrabutylammonium or "tetrabutyl ammonium": 30 applications, 2 pages, Nov. 15, 2002.

Search Results for: "ink jet" and opaque and white and pigment and "quaternary ammonium" or tetrabuytlammonium Or "tetrabutyl ammonium"; Collections searched: WIPO PCT Publications (Full text) 25 matches; 1-20 of 25, www.delphion.com, 1 page, Nov. 15, 2002.

Search Results for: "ink jet" and opaque and white and pigment and "quaternary ammonium" or tetrabuytlammonium or "tetrabutyl ammonium"; Collections searched: WIPO PCT Publications (Full text) 25 matches; 21-25 of 25, www.delphion.com, 1 page, Nov. 15, 2002.

Search Results for: "ink jet" and opaque and white and pigment and "quaternary ammonium" or tetrabuytlammonium or "tetrabutyl ammonium"; Collections searched: WIPO PCT Publications (Full text) 2 matches, www.delphion.com, 1 page, Nov. 14, 2002.

Results of Search in All Years db for: AN/Domino and "ink jet": 37 patents, 2 pages, Nov. 15, 2002.

Search results for: Domino in PA and ink jet; Collections searched: WIPO PCT Publications (Full text) 28 matches, www.delphion.com, 1 page, Nov. 14, 2002.

Search results for: "ink jet" and white and pigment and opaque; Collections searched: Abstracts of Japan, 2 matches, www.delphion.com, 1 page, Nov. 21, 2002.

Results of Search in PGPUB Production Database for: AN/imaje and "ink jet": 2 applications, 1 page, Nov. 15, 2002.

Results of Search in All Years db for: An/imaje and "ink jet": 34 patents, 2 pages Nov. 15, 2002.

Search results for: imaje in PA and ink jet; Collections searched: WIPO PCT Publications (Full text) 10 matches, www.delphion.com, 1 page, Nov. 15, 2002.

* cited by examiner

OPAQUE INK JET INK COMPOSITION

FIELD OF THE INVENTION

This invention pertains to an opaque ink jet ink composition suitable for printing on darkly colored surfaces, particularly darkly colored glass surfaces that may be exposed to condensation or water before, during, or after printing. The messages printed on glass surfaces are resistant to exposure to water and humid conditions.

BACKGROUND OF THE INVENTION

Ink jet printing is a well-known technique by which printing is accomplished without contact between the printing device and the substrate on which the printed characters are deposited. Briefly described, ink jet printing involves the technique of projecting a stream of ink droplets to a surface and controlling the direction of the stream, e.g., electronically, so that the droplets are caused to form the desired printed message on that surface.

The technique of ink jet printing or non-contact printing is particularly well suited for application of characters onto irregularly shaped surfaces, including, for example, glass, metal, or plastic containers, generally used for holding beverage, cosmetic, pharmaceutical, liquor, and health care products.

Reviews of various aspects of ink jet printing can be found in the following publications: Kuhn et al., *Scientific American*, April, 1979, 162-178; and Keeling, *Phys. Technol.*, 12(5), 196-303 (1981). Various ink jet apparatuses are described in the following U.S. Pat. Nos. 3,060,429, 3,298,030, 3,373,437, 3,416,153, and 3,673,601.

In general, an ink jet ink composition must meet certain rigid requirements to be useful in ink jet printing operations. These relate to viscosity, resistivity, solubility, compatibility of components, and wettability of the substrate. Further, the ink jet ink composition must be quick-drying and smear resistant, resist rubbing, and be capable of passing through the ink jet nozzle without clogging, and permit rapid cleanup of the machine components with minimum effort.

In addition, the ink jet ink composition must meet certain other requirements. Many beverage manufacturers fill the containers with chilled beverages, frequently under humid conditions that promote condensation of moisture on the containers. The moisture that condenses on the container surfaces poses a severe problem in obtaining ink penetration, good adhesion, and abrasion resistance of the printed messages. Thus, the ink jet ink composition should allow printing on these containers in the presence of a certain level of condensation, and the printed messages should not be damaged by the condensation. Further, when the containers are immersed in ice water for chilling or exposed to hot water during pasteurization, the printed messages should not disintegrate or be damaged by such treatments. Moreover, the bottles may be exposed to warm and humid conditions, e.g., during warehousing and shipping to different parts of the world and in different seasons. The messages should not be damaged by the hot and cold humid conditions.

A few ink jet ink compositions are reported to be suitable for printing on glass surfaces. For example, U.S. Pat. No. 5,596,027 discloses in an embodiment, a water-based jet ink composition comprising a colorant, a polyamine, and an acidic resin. It is known that water-based inks take a relatively long time to dry on glass substrates. Drying times greater than 10 seconds may be necessary with water-based inks. U.S. Pat. No. 6,221,933 discloses an ink jet ink composition comprising an ink carrier, a colorant, a polyamine, and an acidic resin. This ink composition is capable of producing condensation and moisture resistant images on clear or lightly colored glass surfaces. U.S. Pat. No. 5,652,286 discloses a jet ink composition comprising an organic solvent, a flexible thermoplastic urethane resin, a silicone resin, and a colorant.

Many of the known ink jet ink compositions are not suitable for printing on glass under humid conditions, or do not provide water resistant printed messages on glass surfaces. U.S. Pat. No. 5,693,127 discloses a jet ink comprising a binder, a colorant, a liquid vehicle and an adhesion promoter which is an alkoxysilyl polyalkylene-imine. Although the patent states that the ink is suitable for printing on glass bottles having condensation thereon, certain difficulties are encountered in following its teachings. For example, the alkoxysilyl polyalkylene-imine adhesion promoter does not appear to be commercially available, and the patent does not teach those of ordinary skill in the art how to make this adhesion promoter. Further, the stability of the ink composition containing alkoxysilyl polyalkylene-imines remains uncertain. Additionally, the composition, while suitable for printing on clear or light glass surfaces, does not provide an opaque ink suitable for printing on dark glass surfaces.

U.S. Pat. No. 5,744,519 discloses an ink composition comprising at least one dye, an organic solvent and a binder incorporating the combination of at least one polymeric resin having hydroxyl or carboxyl functions and a hydrophobic polymeric resin of the epoxy type. However, the patent does not suggest ways of producing opaque ink compositions providing good adhesion, good condensation and water resistance and good contrast on dark glass containers.

Thus, there exists a need for an opaque ink jet ink composition meeting one or more of certain critical performance requirements. There exists a need for a fast drying opaque ink jet ink composition that provides high quality messages on various surfaces, particularly darkly colored glass surfaces which may have a condensation of moisture on them. There also exists a need for an opaque ink jet ink composition whose printed messages do not smear, rub off, or otherwise degrade when exposed to moisture, such as ice water immersion, hot water immersion, and/or hot and cold humid conditions.

The advantages of the present invention as well as additional inventive features, will be apparent from the description of the invention provided herein.

BRIEF SUMMARY OF THE INVENTION

The foregoing needs have been fulfilled to a great extent by the present invention that provides opaque ink jet ink compositions that produce high quality messages on surfaces such as glass (e.g., coated or uncoated glass), metal, plastic, and rubber surfaces. The present invention provides opaque ink jet ink compositions whose printed messages have good contrast on darkly colored substrates. The messages do not smear or degrade when exposed to cold water, hot water, and/or hot and cold humid conditions.

The present invention provides an opaque ink jet ink composition and a method of printing a mark or message on a substrate. The ink jet ink composition of the present invention comprises one or more white pigments. The inventive ink jet ink composition also comprises one or more hydrophobic conductive agents. The present inventive ink jet ink composition further comprises one or more organic solvents and one or more binder resins. The present invention further provides a method of printing a mark on a substrate, the method comprising directing a stream of droplets of the ink jet ink composition of the present invention onto a substrate and controlling the direction of the droplets so as to form the mark.

DETAILED DESCRIPTION OF THE INVENTION

The present invention provides an opaque ink jet ink composition. In an embodiment, the ink jet ink composition comprises one or more organic solvents, one or more white pigments, one or more colorless hydrophobic conductive agents, and one or more binder resins including at least one acrylic or styrene acrylic resin. In another embodiment, the ink jet ink composition is free of polyamines and comprises one or more organic solvents, one or more white pigments, one or more hydrophobic conductive agents, and one or more binder resins including at least one acrylic or styrene acrylic resin. In yet another embodiment, the ink jet ink composition comprises one or more organic solvents, one or more white pigments, one or more hydrophobic conductive agents, and one or more binder resins, including at least one acrylic or styrene acrylic resin, and is suitable for printing on glass substrates. In a further embodiment, the opaque ink jet ink composition comprises one or more organic solvents, one or more white pigments, one or more hydrophobic conductive agents, one or more binder resins, and a glass adhesion promoter. In a still further embodiment, the opaque ink jet ink composition is free of polyamines and comprises one or more organic solvents, one or more white pigments, one or more hydrophobic conductive agents including at least one hydrophobic dye, and one or more binder resins. In another embodiment, a yellow opaque ink jet ink composition comprises one or more organic solvents, one or more white pigments, one or more colorless hydrophobic conductive agents, one or more colorants, and one or more binder resins including at least one acrylic or styrene acrylic resin. In yet another embodiment, a blue opaque ink jet ink composition comprises one or more organic solvents, one or more white pigments, one or more colorless hydrophobic conductive agents, one or more colorants, and one or more binder resins including at least one acrylic or styrene acrylic resin.

The ink jet ink composition of the present invention is suitable for use in continuous ink jet printers. For use in continuous ink jet printers, the ink jet ink composition generally has the following characteristics: (1) a viscosity of from about 1.6 to about 7.0 cps at 25° C.; (2) an electrical resistivity of from about 50 to about 2000 ohm-cm; and (3) a sonic velocity of from about 1100 to about 1700 meters/second.

The ink jet ink composition of the present invention can be prepared by any suitable method known to those of ordinary skill in the art. For instance, the components of the composition can be combined and mixed in a suitable mixer or blender. A detailed discussion of each of the components and the characteristics of the inventive ink jet ink composition are set forth below.

Organic Solvent: Any suitable organic solvent can be used as the ink carrier of the ink composition of the present invention. Preferably, an organic solvent that is not completely miscible with water and that has a low boiling point and/or a mixture of such solvents is used as the main ink carrier. Small amounts of high boiling solvents can also be employed in combination with the low boiling solvent. Examples of suitable organic solvents include ketones, such as acetone, methyl ethyl ketone, diethyl ketone, methyl isobutyl ketone, cyclohexanone, and the like; esters such as methyl acetate, ethyl acetate, n-propyl acetate, isopropyl acetate, n-butyl acetate, t-butyl acetate, amyl acetate, methyl lactate, ethyl lactate, n-propyl lactate, isopropyl lactate, n-butyl lactate, methoxy propanol acetate, and the like; alcohols such as methanol, ethanol, n-propanol, isopropanol, n-butanol, t-butanol, n-pentanol, n-hexanol, and the like; glycols such as ethylene glycol, glycerin, diethylene glycol, and the like; glycol ethers such as methoxy propanol, ethylene glycol dimethyl ether, ethylene glycol diethylether, cellosolve, diethylene glycol dimethylether, diethylene glycol diethylether, and the like; and amides, as well as mixtures of two or more of the foregoing. Preferably, the organic solvent comprises lower ketones, lower alcohols, amides, and mixtures thereof. Methyl ethyl ketone is a preferred solvent, optionally in combination with another solvent, i.e., a co-solvent, e.g., methoxy propanol acetate or ethanol.

Any suitable amount of organic solvent can be present. Typically the solvent is present in an amount up to about 95% by weight, preferably in an amount of from about 35% by weight to about 85% by weight, and more preferably in an amount of from about 50% by weight to about 80% by weight of the ink jet ink composition.

White Pigment: The ink jet ink composition of the present invention comprises one or more suitable white pigments. Preferably, the one or more white pigments comprise titanium dioxide. Any suitable titanium dioxide pigment can be used. Titanium dioxide is commercially available in the form of pigment preparations such as White Acrylic Paste, White Vinyl Chip, both available from Penn Color, Inc., and Titanium Dioxide White Paste, available from Gibraltar Chemical Works, Inc.

The white pigments suitable for use in the ink of the present invention may have a suitable range of particle sizes, such as from about 0.01 microns to about 15 microns, preferably from about 0.01 microns to about 5 microns, and more preferably from about 0.01 microns to about 2 microns.

The white pigment can be present in the ink composition in an amount suitable for producing the desired opacity. For example, the titanium dioxide pigment is preferably present in an amount of from about 2% by weight to about 30% by weight, and more preferably in an amount of from about 5% by weight to about 20% by weight of the ink jet ink composition.

Colorant: The ink composition may include one or more optional colorants in an amount sufficient to add a color, e.g., to tint, to add a hue, or a stronger color to the ink composition or to create an opaque color. Adding tint to the ink composition, preferably comprises adding the optional colorant in an amount sufficient to produce a shade of color, e.g., a slight coloration or a pale or delicate variation. Preferably, a yellow, blue, red, or green dye is employed to tint the ink composition. The optional colorant may comprise pigments and/or dyes. In some embodiments, a pigment or dye having reduced water solubility is particularly preferred as an optional colorant. Preferred optional colorants include yellow, blue, green, orange, and/or red dye(s). A mixture of optional colorants may also be used to produce a desired hue. Examples of suitable optional colorants include, Orasol dyes, available from Ciba Specialties, such as Orasol Yellow 2RLN, 2GLN, 3R, 4GN, Orasol Blue BL, GL, GN, Orasol Red, Orasol Pink, Orasol Orange, and Orasol Black, Valifast Colors, available from Orient Chemical, such as Valifast Yellow 3150, 4122, 1101, 1151, 3108, Valifast Blue 1605, 2606, 2620, Valifast Red, Valifast Orange, Valifast Brown, Valifast Black and Oil dyes, also available from Orient Chemical, such as Oil Yellow 129, Oil Pink 312, and Oil Blue 613. Additional examples of suitable optional colored pigments and dyes can be found in U.S. Pat. No. 5,596,027, column 7, line 12 to column 9, line 3, the disclosure of which is incorporated herein by reference.

The optional colorant, when present, is present preferably in an amount up to about 15% by weight, more preferably in an amount up to about 10% by weight, and even more preferably in an amount up to about 7% by weight of the ink composition. For example, the optional colorant may be present in an amount of from about 0.1% by weight to about 10% by weight of the ink jet ink composition.

Hydrophobic Conductive Agent: The ink jet ink composition of the present invention comprises a hydrophobic conductive agent. Hydrophobic conductive agents are conductive agents having a low solubility in water, for example a solubility of about 0.5% by weight or less at 25° C., and more preferably a solubility of about 0.1% by weight or less at 25° C. In some embodiments, the ink jet ink composition includes a colorless hydrophobic conductive agent such as hydrophobic ammonium or phosphonium salts, borates, and phosphates. Examples of preferred colorless hydrophobic conductive agents include those with at least one selected from the group consisting of tetraalkylammonium, tetraarylammonium, tetraalkylphosphonium, and tetraarylphosphonium as the cation and at least one selected from the group consisting of hexafluorophosphate, tetraalkylborate, and tetraarylborate as the anion. Suitable examples include, but are not limited to, tetraethylammonium hexafluorophosphate, tetramethylammonium hexafluorophosphate, tetrabutylammonium tetraphenylborate, tetrabutylammonium tetrabutylborate, and tetrabutylammonium hexafluorophosphate, all available from Aldrich Chemical, tetraphenylphosphonium tetraphenylborate, and tetrapropylammonium hexafluorophosphate. Additionally, the colorless hydrophobic conductive agent may comprise cetyltrimethylammonium bromide, cetyldimethylethylammonium bromide, cetrimide, which is alkyltrimethylammonium bromide, predominantly $C_{14}$, available from Aldrich Chemical and BYK ES-80, which is solution of an alkanolammonium salt of an unsaturated acidic carboxylic acid ester, available from BYK Chemie.

In some embodiments, it may be advantageous to utilize a colored hydrophobic conductive agent, such as a solvent dye and/or a metallic complex dye. Suitable colored hydrophobic conductive agents may comprise any of the optional hydrophobic colored dyes used to add a color to the ink composition, as set forth above.

The hydrophobic conductive agent can be present in the ink jet ink composition of the present invention in any suitable amount. The colorless hydrophobic conductive agents, when present, are preferably present in an amount of less than about 5% by weight, more preferably less than about 3% by weight, and even more preferably less than about 2% by weight of the ink jet ink composition. Colored hydrophobic conductive agents, such as conductive dyes, when present, can be present in an amount up to about 10% by weight of the ink jet ink composition.

Binder Resins: The ink jet ink composition of the present invention comprises one or more binder resins. Any suitable binder resin can be employed. Binder resins that are moderately polar are preferred. For example, binder resins having low polarity tend to produce messages having poor adhesion, and binder resins having high polarity (e.g., those having high affinity to water) tend to produce messages which absorb water and eventually degrade.

Suitable binder resins include acrylic resins, styrene acrylic resins, silicone resins, rosin ester resins, polyesters, polyurethane resins, epoxies, nitrocellulose, cellulose acetate, ketone resins, and mixtures thereof. It is also contemplated that a low molecular weight vinyl resin may be suitable as a binder resin in the present invention. Further, the dispersing resin used with the white pigment (described above) may provide additional functionality as a binder resin.

Preferred acrylic resins and styrene acrylic resins include those having an acid number below about 250, preferably below about 200, and more preferably below about 150. However, in some embodiments, acrylic resins or styrene acrylic resins having higher acid numbers, e.g., an acid number higher than 250 can be used. Examples of suitable styrene acrylic resins include JONCRYL™ 586, 611, 680, 682, 683, 690, 693, and 67 resins, available from S.C. Johnson Polymer. Examples of suitable acrylic resins include the SURCOL™ 836, 860, and 441 resins available from Ciba Specialty Chemicals, CARBOSET™ 525 and 527 resin available from Noveon, and NEOCRYL™ B-725, B-731, B-735, B-810, B-811, B-813, B-814, B-817, B-842, B-890, and B-891 resins, available from NeoResins/Avecia. Other suitable styrene acrylic resins include Dianal acrylic copolymers, available from Dianal America, Inc.

Acrylic resins and styrene acrylic resins having weight average molecular weights less than about 100,000 are preferred, acrylic resins and styrene acrylic resins having weight average molecular weights less than about 50,000 are more preferred, and acrylic resins and styrene acrylic resins having weight average molecular weights less than about 20,000 are most preferred.

Silicone resins may also be present in the ink jet ink compositions of the present invention. Examples of silicone resins include, but are not limited to, dimethyl silicone resin, methyl phenyl silicone resin, and methyltrifluoropropyl silicone resin. Silicone resins are commercially available from Dow Corning Corp. and GE Silicones, and Wacker Silicones, Corp. A preferred silicone resin is the silicone resin DC6-2230 (Dow Corning), which is a polysiloxane having methyl (48%), phenyl (44%), hydroxyl (4%), O-butyl (2%), and O-propyl (1%) substituents.

Rosin ester resins may also be present in the ink jet ink compositions of the present invention. One example of a suitable rosin ester resin is SUPERESTER 75 available from Arakawa Chemical.

Polyurethane resins may also be present in the ink jet ink compositions of the present invention. Polyurethane resins comprise flexible thermoplastic urethanes produced by the reaction of diols and diisocyanates. Examples of diols include ethylene glycol, propylene glycol, propanediol, butanediol, polyethylene glycol, polypropylene glycol, polyethylene glycol adipate diol, polyethylene glycol succinate diol, polytetrahydrofuran diol, and the like. Examples of diisocyanates include 2,4-tolylene diisocyanate, 2,6-tolylene diisocyanate, 4,4-diphenylmethane diisocyanate, hexamethylene diisocyanate, and the like.

Polyurethane resins having weight average molecular weights in the range of about 4,000 to about 25,000 are preferred and polyurethane resins having weight average molecular weights in the range of about 7,000 to about 9,000 are even more preferred.

Examples of preferred polyurethane resins that can be used in the ink composition of the present invention include, but are not limited to, the flexible thermoplastic solutions sold under the commercial name of SURKOPAK™ by Kane International Corp., Rye, N.Y. A variety of grades of polyurethane solutions are sold under this name and include SURKOPAK 2135, SURKOPAK 5299, SURKOPAK 5244, SURKOPAK 5255, SURKOPAK 2X, SURKOPAK 5322, SURKOPAK 5311, and SURKOPAK XL. Among these preferred polyurethane solutions, even more preferred is SURKOPAK 5322, which is a polyurethane composed of polypropylene glycol and 4,4'-diphenylmethane diisocyanate. SURKOPAK 5322 is sold as a solution in a mixed solvent containing ethyl acetate and isopropanol.

The binder resin or resins can be present in the ink jet ink composition of the present invention in any suitable amount. The binder resin (or resins) is preferably present in an amount of from about 5% by weight to about 45% by weight, more preferably from about 5% by weight to about 35% by weight, and even more preferably, from about 5% by weight to about 25% by weight of the ink jet ink composition.

In an embodiment, the ink jet ink composition contains an acrylic resin or a styrene acrylic resin, which is used as the primary or main binder resin, and a co-resin which is a resin other than the primary or main resin. Any of the binder resins described above, as well as a vinyl resin may also be used as the co-resin.

Glass Adhesion Promoter: The jet ink composition of the present invention can also include a suitable glass adhesion promoter to improve or enhance the adhesion of the printed message to glass substrates. The glass adhesion promoter is typically a monomeric compound of low molecular weight, although dimeric, trimeric, or higher oligomeric compounds are also contemplated. These compounds contain one or more reactive groups, e.g., epoxy groups. Without wishing to be bound to any particular theory or mechanism, it is believed that the monomeric compound becomes oligomeric upon reaction with water present on the surface of the glass or in the atmosphere, and reacts with the glass surface to form covalent bonds. Typically, glass adhesion promoters do not comprise resins, e.g., high molecular weight resins. Examples of suitable glass adhesion promoters include silanes and titanates. Preferably, the glass adhesion promoter comprises a silane, such as SILQUEST® WETLINK 78, which is glycidoxypropyl triethoxymethylsilane, SILQUEST A-link 25, which is 3-isocyanatopropyltriethoxysilane, A-Link 35, which is 3-isocyanatopropyltrimethoxysilane, Silane A-186, which is β-(3,4-epoxycyclohexyl)ethyltrimethoxysilane, Silane A-187, which is γ-glycidoxypropyl trimethoxysilane, Silane A-1100, which is gamma-aminopropyltriethoxysilane, and Coatosil 1770, which is β-(3,4-epoxycyclohexyl)ethyltriethoxysilane, all available from OSI Specialties and ADDID 900, which is amino-functional trimethoxy silane and 940, which is methacrylic trimethoxy-functional silane, available from Wacker Silicones Corp.

The glass adhesion promoter can be present in any suitable amount, for example, from about 0.1% by weight to about 5% by weight, and preferably in an amount of from about 0.1% by weight to about 3% by weight of the ink jet ink composition.

Additional Components: The ink jet ink composition of the present invention can further include a variety of additional components, such as surfactant(s) to optimize the wetting and drying characteristics of the ink, dispersing agent(s) to improve dispersion stability, plasticizer(s) to improve the durability of the ink, humectant(s) to prevent drying of the ink on the print head and during storage, and defoamer(s) to prevent foaming of the ink during its preparation, as well as during the printing operation of the ink. Any suitable surfactant, dispersing agent, plasticizer, humectant, and/or defoamer, known to those skilled in the art may be used in the ink composition of the present invention.

For example, suitable surfactants disclosed in the examples herein include SILWET L7622 from OSi Specialties. Suitable dispersing agents disclosed in the examples herein include BYK P104S from BYK-Chemie. Suitable plasticizers disclosed in the examples herein include Plasticizer-8 from Rit-Chem Co. Suitable defoamers disclosed in the examples herein include BYK 065 from BYK-Chemie.

The following examples further illustrate the invention but, of course, should not be construed as in any way limiting its scope.

EXAMPLE 1

This example demonstrates embodiments of an opaque ink jet ink composition of the present invention. The following ingredients were employed in the following amounts.

| Ingredients | Parts |
|---|---|
| FORMULATION 1 | |
| Methyl ethyl ketone (Ashland) | 49 |
| Ethanol CDA-19 (EMCO Chemical) | 10 |
| JONCRYL 611 (S. C. Johnson Wax) | 14 |
| SUPERESTER A75 (Arakawa) | 2 |
| Plasticizer-8 (N-ethyltoluenesulfonamide, Rit-Chem Co.) | 1 |
| BYK P104S (BYK-Chemie) | 0.5 |
| BYK 065 (BYK-Chemie) | 0.2 |
| Acrylic Paste (contains 50% $TiO_2$, Penn Color, Inc.) | 17 |
| Methoxy propanol (Ashland) | 3 |
| WETLINK 78 (OSi Specialties) | 2 |
| SILWET L7622 (OSi Specialties) | 0.1 |
| Tetrabutylammonium hexafluorophosphate (TBAPF6, from Aldrich) | 1.2 |
| Total | 100 |
| FORMULATION 2 | |
| Methyl ethyl ketone | 62.2 |
| JONCRYL 61.1 | 17 |
| Silicone Resin (Dow Corning) | 3 |
| $TiO_2$ White Paste (Gibraltar) | 13 |
| Methoxy propanol acetate (Magnum Intl.) | 1.5 |
| WETLINK 78 | 2 |
| SILWET L7622 | 0.1 |
| TBAPF6 | 1.2 |
| Total | 100 |
| FORMULATION 3 | |
| Methyl ethyl ketone | 64.2 |
| JONCRYL 611 | 17 |
| Silicone Resin (Dow Corning) | 3 |
| $TiO_2$ White Paste (Gibraltar) | 13 |
| Methoxy propanol acetate | 1.5 |
| SILWET L7622 | 0.1 |
| TBAPF6 | 1.2 |
| Total | 100 |

The ink jet ink compositions prepared from the above ingredients was printed on a clear bottle and two types of amber bottle.

The following tests were carried out on the printed bottles:

Test A: The printed message was rubbed with the thumb using medium pressure eight seconds after printing and the number of rubs needed to remove the message was noted.

Test B: The printed bottles were immersed in water (at 23° C.) for 5 minutes and then rubbed with the thumb using medium pressure and the number of rubs needed to remove the message was noted.

Test $C_1$: After being subjected to Test B without rubbing, the printed bottles were cold filled and allowed to stand for 5 minutes at ambient conditions. The printed bottles were then rubbed with the thumb using medium pressure and the number of rubs needed to remove the message was noted.

Test $C_2$: After being subjected to Test B without rubbing, the printed bottles were cold filled (liquid at 4° C.) and allowed to stand for 5 minutes at 25° C. and 95% relative humidity. The printed bottles were then rubbed with the thumb using medium pressure and the number of rubs needed to remove the message was noted.

Test D: After being subjected to Test $C_1$ without rubbing, the printed bottles were immersed in 70° C. water for 40 minutes. The printed bottles were then rubbed with the thumb using medium pressure and the number of rubs needed to remove the message was noted.

Test E: After being subjected to Test D without rubbing, the printed bottles were immersed in ice/water for 16 hours and then rubbed with the thumb using medium pressure and the number of rubs needed to remove the message was noted.

Test $F_1$: After being subjected to Test $C_1$ without rubbing, the printed bottles were allowed to stand overnight and then were immersed in ice/water for 16 hours. The printed bottles were then rubbed with the thumb using medium pressure and the number of rubs needed to remove the message was noted.

Test $F_2$: After being subjected to Test $C_1$ without rubbing, the printed bottles were allowed to stand for 2 hours and then were immersed in ice/water for 16 hours. The printed bottles were then rubbed with the thumb using medium pressure and the number of rubs needed to remove the message was noted.

The results reported are within the limits of experimental error (e.g., errors caused by the variation of glass surfaces, e.g., due to glass surfaces of different type and/or glass provided from different sources). The messages printed from the ink jet ink composition of Formulation 1 were tested using Tests A-$F_2$. The messages had good rub resistance on all three bottles and in each of the tests required ten or more rubs to be removed. The messages printed from the ink jet ink composition of Formulation 2 were tested; in Tests A-$F_1$, the messages had good rub resistance on all three types of bottles, and in Tests A-$C_1$ and Tests D-$F_1$, the messages required 10 or more rubs to be removed. In Test $C_2$, the message printed on the clear bottle and an amber bottle required 10 or more rubs to be removed. The messages printed from the ink jet ink composition of Formulation 3 were tested using Tests A-$F_1$ and required ten or more rubs to be removed on all three bottles in Tests A, $C_1$, D, and E. In Test B, ten or more rubs were required to remove the message from an amber bottle, and in Tests $C_2$ and $F_1$, ten rubs were required to remove the message from the amber bottle.

EXAMPLE 2

This example illustrates additional embodiments of an opaque ink jet ink composition of the present invention. The following ingredients were employed in the following amounts.

| Ingredients | Parts |
| --- | --- |
| FORMULATION 4 | |
| Methyl ethyl ketone | 56.8 |
| JONCRYL 611 | 12.0 |
| Methoxy propanol acetate | 1.5 |
| Silicone DC6-2230 (Dow Corning) | 3.0 |
| SURKOPAK Polyurethane 5322 (Mitchanol) | 11.0 |
| WETLINK 78 | 1.5 |
| SILWET L-7622 | 0.1 |
| TBAPF6 | 1.1 |
| $TiO_2$ White 955-39600 (Gibraltar) | 13.0 |
| Total | 100 |
| FORMULATION 5 | |
| Methyl ethyl ketone | 55.9 |
| JONCRYL 611 | 12.0 |
| Methoxy propanol acetate | 1.5 |
| Silicon DC6-2230 | 3.0 |
| SURKOPAK Polyurethane 5322 | 11.0 |
| WETLINK 78 | 1.5 |
| SILWET L-7622 | 0.1 |
| Tetrabutylammonium tetraphenylborate (Aldrich) | 2.0 |
| $TiO_2$ White 955-39600 | 13.0 |
| Total | 100 |
| FORMULATION 6 | |
| Methyl ethyl ketone | 59.7 |
| JONCRYL 611 | 20.0 |
| Methoxy propanol acetate | 1.5 |
| Silicone DC6-2230 | 3.0 |
| WETLINK 78 | 1.5 |
| SILWET L-7622 | 0.1 |
| TBAPF6 | 1.2 |
| $TiO_2$ White 955-39600 | 13.0 |
| Total | 100 |
| FORMULATION 7 | |
| Methyl ethyl ketone | 57.7 |
| Ethanol CDA-19 200 Proof | 11.0 |
| JONCRYL 611 | 11.0 |
| SUPERESTER A-75 | 2.0 |
| Plasticizer 8 | 1.0 |
| Methoxy propanol acetate | 1.0 |
| WETLINK 78 | 2.0 |
| SILWET L-7622 | 0.1 |
| TBAPF6 | 1.2 |
| $TiO_2$ White 955-39600 | 13.0 |
| Total | 100 |
| FORMULATION 8 | |
| Methyl ethyl ketone | 51.0 |
| Ethanol CDA-19 200 Proof | 11.0 |
| JONCRYL 611 | 11.0 |
| SUPERESTER A-75 | 2.0 |
| Plasticizer 8 | 1.0 |
| Methoxy propanol acetate | 3.0 |
| BYK P104S | 0.5 |
| BYK 065 | 0.2 |
| WETLINK 78 | 2.0 |
| SILWET L-7622 | 0.1 |
| TBAPF6 | 1.2 |
| White Acrylic Paste 29W599 (Penn Color) | 17.0 |
| Total | 100. |

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Embodiments of this invention are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A white opaque ink jet ink composition comprising one or more organic solvents, one or more white pigments, one or more colorless hydrophobic conductive agents having a solubility of 0.5% by weight or less in water at 25° C., and one or more binder resins, wherein at least one binder resin comprises an acrylic or styrene acrylic resin, and optionally a glass adhesion promoter, and if the glass adhesion promoter is a silane, it would be present in an amount from about 0.1% to about 5% by weight of the ink jet ink composition, wherein the ink jet ink composition is free of polyamines.

2. The white opaque ink jet ink composition according to claim 1, wherein the one or more white pigments comprise titanium dioxide.

3. The white opaque ink jet ink composition according to claim 1, further comprising one or more colorants in an amount sufficient to tint or add hue to the ink composition.

4. The white opaque ink jet ink composition according to claim 3, wherein the one or more colorants comprise a pigment and/or a dye.

5. The white opaque ink jet ink composition according to claim 4, wherein the dye comprises a yellow dye, a blue dye, an orange dye, a red dye, a green dye, or any combination thereof.

6. The white opaque ink jet ink composition according to claim 5, which includes yellow and/or blue dyes.

7. The white opaque ink jet ink composition according to claim 1, which contains an acrylic resin and a styrene acrylic resin.

8. The white opaque ink jet ink composition according to claim 1, which contains the acrylic or styrene acrylic resin in an amount from about 5 to about 25% by weight of the ink composition.

9. The white opaque ink jet ink composition according to claim 1, wherein the silane comprises an epoxy functional group.

10. A white opaque ink jet ink composition comprising one or more organic solvents, one or more white pigments, one or more colorless hydrophobic conductive agents and one or more binder resins, wherein at least one binder resin comprises an acrylic or styrene acrylic resin, and optionally a glass adhesion promoter, and if the glass adhesion promoter is a silane, it would be present in an amount from about 0.1% to about 5% by weight of the ink jet ink composition, wherein the ink jet ink composition is free of polyamines, wherein the one or more colorless hydrophobic conductive agents comprise at least one selected from the group consisting of tetraalkylammonium, tetraarylammonium, tetraalkylphosphonium, and tetraarylphosphonium as the cation and at least one selected from the group consisting of hexafluorophosphate, tetraalkylborate, and tetraarylborate as the anion.

11. The white opaque ink jet ink composition according to claim 10, wherein the one or more colorless hydrophobic conductive agents comprise at least one selected from the group consisting of tetrabutylammonium hexafluorophosphate, tetrapropylammonium hexafluorophosphate, tetraethylammonium hexafluorophosphate, tetramethylammonium hexafluorophosphate, tetrabutylammonium tetraphenylborate, and tetrabutylammonium tetrabutylborate.

12. The white opaque ink jet ink composition according to claim 10, wherein the one or more colorless hydrophobic conductive agents comprise at least one selected from the group consisting of tetrabutylammonium hexafluorophosphate, tetrapropylammonium hexafluorophosphate, and tetrabutylammonium tetraphenylborate.

13. The white opaque ink jet ink composition according to claim 1, further comprising at least one selected from the group consisting of a humectant, a co-solvent, a co-resin, a defoamer, a dispersing agent and a surfactant.

14. An opaque ink jet ink composition comprising one or more organic solvents, wherein at least one organic solvent is methyl ethyl ketone, one or more white pigments, one or more colorless hydrophobic conductive agents having a solubility of 0.5% by weight or less in water at 25° C., one or more binder resins, and a glass adhesion promoter, wherein, if the glass adhesion promoter is a silane, it would be present in an amount from about 0.1% to about 5% by weight of the ink jet ink composition, wherein the ink jet ink composition is free of polyamines.

15. The opaque ink jet ink composition according to claim 14, wherein the one or more white pigments comprise titanium dioxide.

16. The opaque ink jet ink composition according to claim 14, wherein the silane comprises an epoxy fictional group.

17. The opaque ink jet ink composition according to claim 14, wherein at least one binder resin comprises an acrylic or styrene acrylic resin.

18. The opaque ink jet ink composition according to claim 17, which contains the acrylic or styrene acrylic resin in an amount from about 5 to about 25% by weight of the ink composition.

19. The opaque ink jet ink composition according to claim 14, which contains an acrylic resin and a styrene acrylic resin.

20. The opaque ink jet ink composition according to claim 14, further comprising on or more colorants.

21. The opaque ink jet ink composition according to claim 20, wherein the one or more colorants are present in an amount sufficient to tint, add a hue, add a stronger color, or create an opaque color.

22. The opaque ink jet ink composition according to claim 20, wherein the one or more colorants comprise a pigment and/or a dye.

23. The opaque ink jet ink composition according to claim 22, wherein the dye comprises a yellow dye, a blue dye, an orange dye, a red dye, a green dye, or any combination thereof.

24. The opaque ink jet ink composition according to claim 23, which includes blue and/or yellow dyes.

25. The opaque ink jet ink composition according to claim 14, wherein the one or more colorless hydrophobic conductive agents comprise at least one selected from the group consisting of tetraalkylammonium, tetraarylammonium, tetraalkylphosphonium, and tetraarylphosphonium as the cation and at least one selected from the group consisting of hexafluorophosphate, tetraalkylborate, and tetraarylborate as the anion.

26. The opaque ink jet ink composition according to claim 25, wherein the one or more colorless hydrophobic conductive agents comprise at least one selected from the group consisting of tetrabutylammonium hexafluorophosphate, tetrapropylammonium hexafluorophosphate, tetraethylammonium hexafluorophosphate, tetramethylammonium hexafluorophosphate, tetrabutylammonium tetraphenylborate, and tetrabutylammonium tetrabutylborate.

27. The opaque ink jet ink composition according to claim 25, wherein the one or more colorless hydrophobic conductive agents comprise at least one selected from the group consisting of tetrabutylammonium hexafluorophosphate, tetrapropylammonium hexafluorophosphate, and tetrabutylammonium tetraphenylborate.

28. The opaque ink jet ink composition according to claim 14, further comprising at least one selected from the group consisting of a humectant, a co-solvent, a co-resin, a defoamer, a dispersing agent and a surfactant.

29. A white opaque ink jet ink composition comprising one or more organic solvents wherein at least one organic solvent is methyl ethyl ketone, one or more white pigments, one or more hydrophobic conductive agents having a solubility of 0.5% by weight or less in water at 25° C., and one or more binder resins, wherein at least one binder resin comprises an acrylic or styrene acrylic resin and the ink jet ink composition is free of polyamines, and optionally a glass adhesion promoter, and if the glass adhesion promoter is a silane, it would be present in an amount from about 0.1% to about 5% by weight of the ink jet ink composition.

30. The white opaque ink jet ink composition according to claim 29, wherein the one or more white pigments comprise titanium dioxide.

31. The white opaque ink jet ink composition according to claim 29, further comprising one or more colorants.

32. The white opaque ink jet ink composition according to claim 31, wherein the one or more colorants are present in an amount sufficient to tint, add a hue, add a stronger color, or create an opaque color.

33. The white opaque ink jet ink composition according to claim 29, which contains the acrylic or styrene acrylic resin in an amount of from about 5 to about 25% by weight of the ink composition.

34. The white opaque ink jet ink composition according to claim 29, which contains an acrylic resin and a styrene acrylic resin.

35. An opaque ink jet ink composition comprising one or more organic solvents, one or more white pigments, one or more colorless hydrophobic conductive agents having a solubility of 0.5% by weight or less in water at 25° C., and one or more binder resins, and optionally a glass adhesion promoter, and if the glass adhesion promoter is a silane, it would be present in an amount from about 0.1% to about 5% by weight of the ink jet ink composition, wherein the ink jet ink composition is free of polyamines, at least one binder resin comprises an acrylic or styrene acrylic resin, and the ink jet ink composition is suitable for printing on a glass substrate.

36. The opaque ink jet ink composition according to claim 35, wherein the one or more white pigments comprise titanium dioxide.

37. The opaque ink jet ink composition according to claim 35, further comprising one or more colorants.

38. The opaque ink jet ink composition according to claim 37, wherein the one or more colorants are present in an amount sufficient to tint, add a hue, add a stronger color, or create an opaque color.

39. The opaque inkjet ink composition according to claim 35, which contains the acrylic or styrene acrylic resin in an amount from about 5 to about 25% by weight of the ink composition.

40. The opaque ink jet ink composition according to claim 35, which contains an acrylic resin and a styrene acrylic resin.

41. An opaque ink jet ink composition comprising one or more organic solvents, one or more white pigments, one or more colorless hydrophobic conductive agents having a solubility of 0.5% by weight or less in water at 25° C., one or more binder resins, and one or more colorants, wherein the ink jet ink composition is free of polyamines.

42. The opaque ink jet ink composition according to claim 41, wherein the one or more colorants are present in an amount sufficient to tint, add a hue, add a stronger color, or create an opaque color.

43. A yellow opaque ink jet ink composition comprising one or more organic solvents wherein at least one organic solvent is methyl ethyl ketone, one or more white pigments, one or more colorless hydrophobic conductive agents having a solubility of 0.5% by weight or less in water at 25° C., one or more yellow colorants, and one or more binder resins, and optionally a glass adhesion promoter, and if the glass adhesion promoter is a silane, it would be present in an amount from about 0.1% to about 5% by weight of the ink jet ink composition, wherein the ink jet ink composition is free of polyamines and at least one binder resin comprises an acrylic or styrene acrylic resin.

44. A blue opaque ink jet ink composition comprising one or more organic solvents wherein at least one organic solvent is methyl ethyl ketone, one or more white pigments, one or more colorless hydrophobic conductive agents having a solubility of 0.5% by weight or less in water at 25° C., one or more blue colorants, and one or more binder resins, and optionally a glass adhesion promoter, and if the glass adhesion promoter is a silane, it would be present in an amount of from about 0.1% to about 5% by weight of the ink jet ink composition, wherein the ink jet ink composition is free of polyamines, and at least one binder resin comprises an acrylic or styrene acrylic resin.

45. A red opaque ink jet ink composition comprising one or more organic solvents wherein at least one organic solvent is methyl ethyl ketone, one or more white pigments, one or more colorless hydrophobic conductive agents having a solubility of 0.5% by weight or less in water at 25° C., one or more red colorants, and one or more binder resins, and optionally a glass adhesion promoter, and if the glass adhesion promoter is a silane, it would be present in an amount from about 0.1% to about 5% by weight of the ink jet ink composition, wherein the ink jet ink composition is free of polyamines and at least one binder resin comprises an acrylic or styrene acrylic resin.

46. A method of printing a mark on a substrate comprising directing a stream of droplets of the ink jet ink composition of claim 1 onto a substrate and controlling the direction of the droplets so as to form the mark.

47. A method of printing a mark on a substrate comprising directing a stream of droplets of the ink jet ink composition of claim 14 onto a substrate and controlling the direction of the droplets so as to form the mark.

48. A yellow opaque ink jet ink composition comprising one or more organic solvents, one or more white pigments, one or more colorless hydrophobic conductive agents having a solubility of 0.5% by weight or less in water at 25° C., one or more yellow colorants, and one or more binder resins, and optionally a glass adhesion promoter, and if the glass adhesion promoter is a silane, it would be present in an amount from about 0.1% to about 5% by weight of the ink jet ink composition, wherein the ink jet ink composition is free of polyamines, and at least one binder resin comprises an acrylic or styrene acrylic resin.

49. A blue opaque ink jet ink composition comprising one or more organic solvents, one or more white pigments, one or more colorless hydrophobic conductive agents having a solubility of 0.5% by weight or less in water at 25° C., one or more blue colorants, and one or more binder resins, and optionally a glass adhesion promoter, and if the glass adhesion promoter is a silane, it would be present in an amount from about 0.1% to about 5% by weight of the ink jet ink composition, wherein the ink jet ink composition is free of polyamines, and at least one binder resin comprises an acrylic or styrene acrylic resin.

50. A red opaque ink jet ink composition comprising one or more organic solvents, one or more white pigments, one or more colorless hydrophobic conductive agents having a solubility of 0.5% by weight or less in water at 25° C., one or more red colorants, and one or more binder resins, and optionally a glass adhesion promoter, and if the glass adhesion promoter is a silane, it would be present in an amount from about 0.1% to about 5% by weight of the ink jet ink composition, wherein the ink jet ink composition is free of polyamines, and at least one binder resin comprises an acrylic or styrene acrylic resin.

* * * * *